United States Patent Office 3,340,883
Patented Sept. 12, 1967

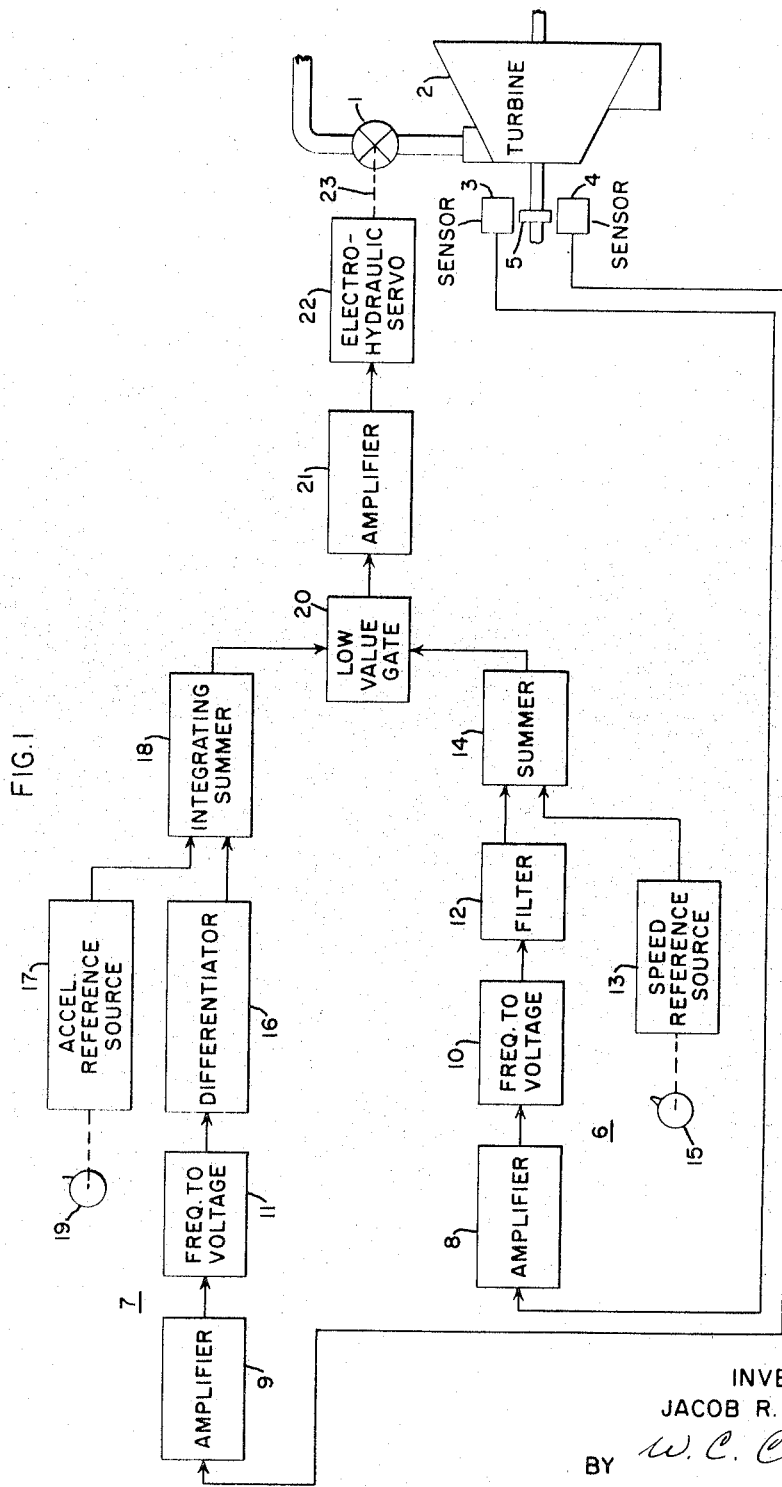

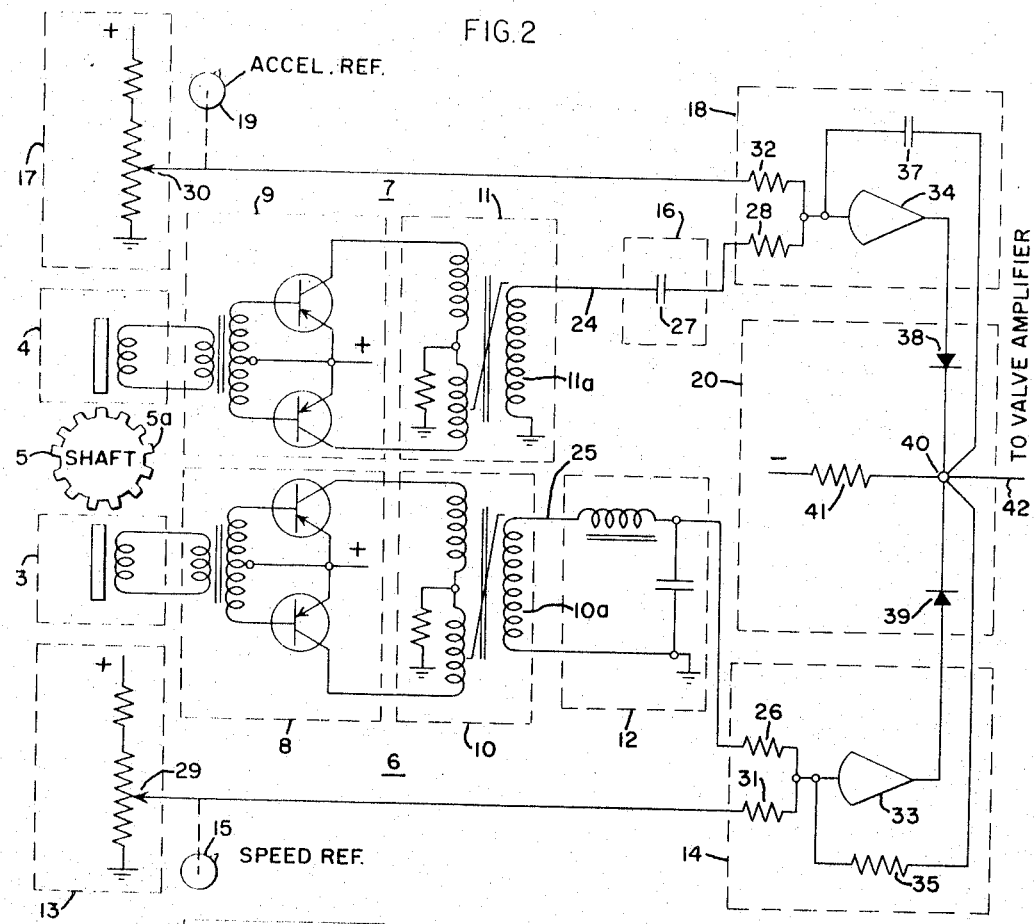
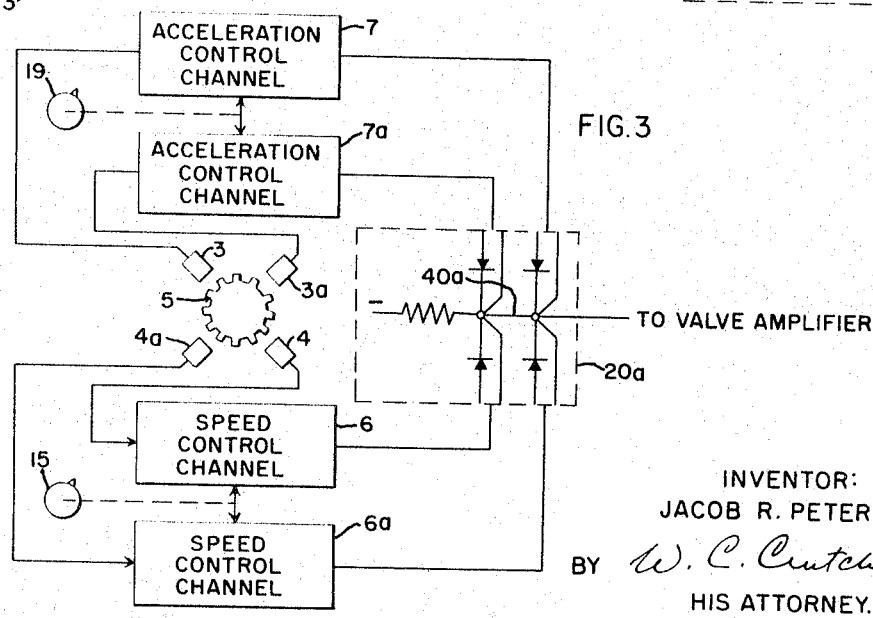

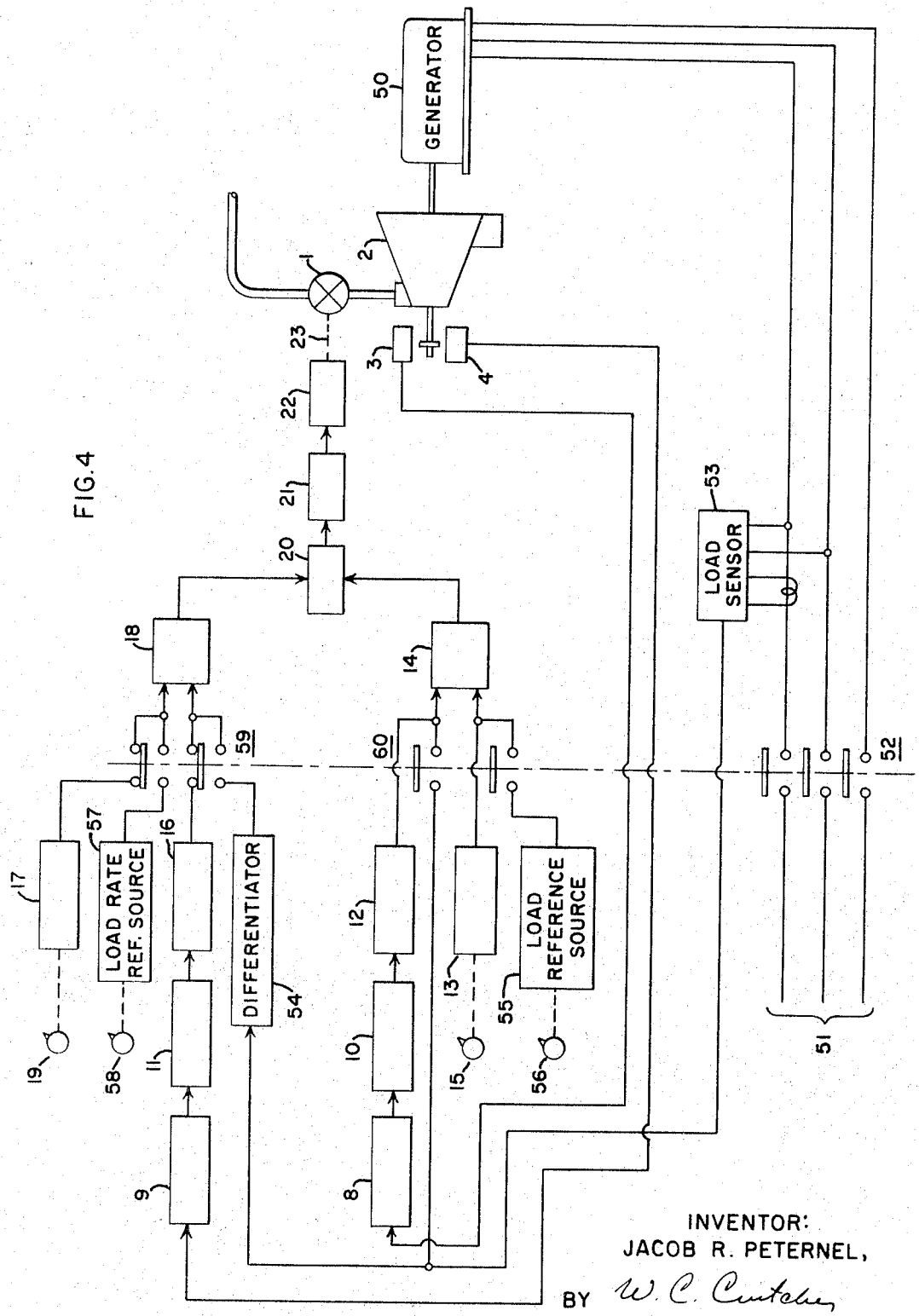

3,340,883
ACCELERATION, SPEED AND LOAD CONTROL
SYSTEM WITH REDUNDANT CONTROL MEANS
Jacob R. Peternel, Schenectady, N.Y., assignor to General
Electric Company, a corporation of New York
Filed Apr. 12, 1966, Ser. No. 542,157
14 Claims. (Cl. 137—26)

ABSTRACT OF THE DISCLOSURE

In turbine control system, condition error signal and rate of change of condition error signal are obtained and applied to gating device which allows only the signal which would result in smallest valve opening to position the valve. Redundant or alternative sets of condition signals may employ same gating device.

---

This is a continuation-in-part of my patent application, Ser. No. 407,188 filed Oct. 28, 1964, now abandoned, entitled "Acceleration and Speed Control System" and assigned to the assignee of the present application.

This invention relates to an improved control system for a prime mover, such as a steam turbine. More particularly, the invention relates to an electrical control system for obtaining controlled acceleration of a prime mover over a wide range of speeds and also for accurately controlling speed once a desired speed is achieved. The invention further relates to a control system for obtaining controlled rate of loading of the prime mover and for accurately controlling load once the desired load is achieved.

It is necessary to control the acceleration of a large steam turbine from standstill to rated speed. Once the turbine is at full speed, it is necessary to control the addition of load to the turbine. Traditionally, acceleration and addition of load have been accomplished by manual control of the steam valves. Scheduling of the startup time and loading in a predictable fashion are desirable in order to reduce the imposition of thermal stresses on the turbine parts as the hot steam is admitted to the turbine.

Electrical control systems for controlling speeds and accelerations by comparing actual speeds or actual accelerations with reference signals in a closed loop are known in the art. Solid state operational amplifiers have been used to provide desired functions in the form of electrical signals and the resulting amplified electrical signals used to operate servo valves which, in turn, actuate hydraulic valve motors to control the admission of steam to the turbine.

Highly reliable systems have been developed which have included redundant speed error signals. Such a redundant speed control system is disclosed in U.S. Patent 3,274,443 granted Sept. 20, 1966 to M. A. Eggenberger and P. H. Troutman and assigned to the assignee of the present application. One component of this control system is a gating device which passes only the one of two speed error signals which calls for the lowest turbine speed.

An improved acceleration limiting long range speed control is disclosed in U.S. Patent 3,288,160 granted Nov. 29, 1966 to M. A. Eggenberger and P. H. Troutman and assigned to the assignee of the present application. In that application, acceleration responsive and speed responsive signals were combined in a series of operational amplifiers to obtain a valve positioning signal. While this arrangement is entirely satisfactory, it requires several cascaded operational amplifiers and lacks a certain degree of flexibility, in that the speed and acceleration closed loops are intermeshed in a manner such that any design changes in the speed control portion affect the acceleration control portion and vice versa.

After the turbine is at full speed, load is applied gradually. In the case where the turbine is driving a generator, this occurs after the generator has been connected through the breaker to a main electrical network supplied by other generators. In this case, the network frequency controls the turbine-generator speed, and load is applied by opening the steam valves wider. Partial loading with the steam control valves wide open may be carried out through the use of a by-pass in the main stop valve of the type shown in U.S. Patent 3,098,176, issued July 16, 1963, after the by-pass has been used to bring the turbine up to speed. However, loading causes thermal stresses due to admission of additional steam. Hence it would be desirable to add load at a selectable rate and to control load once the desired load is achieved.

Accordingly, one object of the present invention is to provide an improved control system for limiting the rate at which a variable condition approaches its desired value and thereafter holding the condition at that value.

Another object of the present invention is to provide an improved acceleration and speed control system for a prime mover which is flexible, uses a minimum of components, and which shifts automatically from acceleration control to speed control.

Another object of the invention is to provide an improved load rate and load control system which switches automatically from load rate control to load control.

Another object of the invention is to provide an improved speed and acceleration control for an electrohydraulic turbine control system which accelerates the turbine according to a selected acceleration schedule, despite variations in steam pressure or other disturbances, with reliable speed control once the turbine reaches a set terminal speed.

Still another object of the invention is to provide an improved acceleration and speed control, which is adaptable to inclusion of more than one acceleration responsive signal and/or more than one speed responsive signal to achieve redundancy in acceleration and/or speed control modes.

Another object of the invention is to provide closed loop speed control and closed loop acceleration control which function separately through a gating device so that the loops are largely independent of one another.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a block diagram of the acceleration and speed control as applied to a steam turbine with an electrohydraulic control system, FIG. 2 is a simplified schematic drawing of one form of the acceleration and speed control system, and FIG. 3 is a very simplified block diagram showing the inventive concept extended to include redundant signals for both acceleration and speed control.

FIG. 4 is a simplified block diagram showing the invention adapted to perform the foregoing acceleration and speed control, as well as load rate and load control after the turbine is at speed.

Briefly stated, the invention is practiced by obtaining a first signal representing deviation from a selected reference condition and also obtaining a second signal representing the deviation from a selected reference representing rate of change of the condition, and applying the two signals to a gating device. This gating device allows passage of only one of the signals, this being the signal calling for the smallest steam valve opening. In one modified form, two sets of such signals may be applied to the gating device simultaneously to achieve added reliability through redundant signals. In another modified form, sets of signals representing different conditions may be applied alternatively to the gating device for alternate types of control.

Referring now to FIG. 1 of the drawing, a valve 1 controls the admission of steam to a turbine 2, although th invention is applicable to any type of prime mover. A pair of variable magnetic reluctance sensors 3, 4, responsive to rotation of a toothed wheel 5 on the turbine shaft, generate electrical pulses with a frequency proportional to the speed of turbine 2. The signals from sensor 3 are applied to a speed control channel shown generally as 6, while the signals from sensor 4 are applied to the acceleration control channel designated generally as 7. The pulses are amplified in substantially identical amplifiers 8, 9, and then converted to DC voltages which are proportional to frequency, hence turbine speed, in the substantially identical frequency-to-voltage converters 10, 11. In the speed channel 6, this DC voltage is filtered at 12 to remove ripple and compared to a DC reference voltage of opposite polarity from source 13 in summing device 14. The magnitude of the speed reference voltage is controlled by knob 15.

In the acceleration channel 7, the signal from converter 11, which is responsive to actual turbine speed, is differentiated with respect to time in device 16 to provide a DC voltage proportional to actual acceleration of the turbine. This acceleration-responsive voltage is compared to a DC acceleration reference signal received from voltage source 17 and the resulting error signal is integrated with respect to time in an integrating summer 18. The magnitude of the acceleration reference voltage is controlled by knob 19.

The output from speed summer 14 is the "speed error" signal representing the deviation between a desired turbine speed and actual turbine speed. The output from integrating summer 18 is an "integrated acceleration error signal," representing the time integral of a voltage difference which, in turn, represents the deviation of the actual turbine acceleration from a desired turbine acceleration. The outputs from summer 14 and integrating summer 18 are applied to a low value gate 20 which is designed to pass only the error signal which will result in the most closed position of steam turbine valve 1, i.e. the least steam flow. The gated error signal is amplified at 21 and actuates an electrohydraulic servomechanism 22 which moves the steam valve 1 by means of hydraulic rams (not shown) as indicated by dotted line 23. The valve positioning mechanism is of the type employing valve position feedback so that a selected voltage level applied to amplifier 21 will result in an equivalent valve position. The details of this mechanism are immaterial to the present invention but may be such as employed in U.S. Patents 3,098,176 or 2,977,768, for example.

Referring to FIG. 2 of the drawing, a simplified circuit diagram is illustrated. The portions of the circuit diagram corresponding to the functional blocks in FIG. 1 are enclosed by dash lines and provided with the same reference numerals as in FIG. 1. Speed sensors 3, 4 comprise variable reluctance or magnetic pickups mounted in close proximity to uniformly spaced teeth 5a on wheel 5. The output from each sensor 3, 4 is a sine wave which is amplified in the transistorized power amplifiers 8, 9 respectively. Each amplifier includes two PNP transistors arranged in push-pull relationship and operating in switching mode to provide a high power square wave of the same frequency as sensed by the sensors 3, 4. The square waves are furnished as the input to frequency-to-voltage coverters 10, 11. These comprise transformers with saturating cores. The cores saturate on each pulse and the average voltage appearing across the secondary windings 10a, 11a is directly proportional to the frequency of the pulses. The connections of the windings are such that a DC voltage appears on output leads 24, 25 which is negative with respect to ground, becoming more negative as the rotational speed of the turbine increases.

In the speed channel 6, the output from converter 10 is filtered as indicated by the LC circuit in box 12 to remove any ripple. This filtered voltage representing actual speed is applied to an input resistor 26 of the summer 14, which is preferably an operational amplifier.

In the acceleration channel 7, the speed responsive voltage from converter 11 is differentiated with respect to time by means of a series capacitor 27 to become a signal responsive to actual turbine acceleration, i.e., rate of change of turbine speed with respect to time. This signal is applied through an input resistor 28 of the integrating summer 18. The polarity of the signal is such that it is negative when the turbine is accelerating and positive when the turbine is decelerating.

Speed reference and acceleration reference sources may be obtained from any suitable high quality constant voltage DC source. Under actual conditions, one or both of the voltages can be obtained from the output of amplifiers 8, 9 and regulated to provide a constant DC voltage as disclosed in aforementioned patent application Ser. No. 328,281. To simplify the disclosure, these are shown simply as voltage dividers connected between an unidentified suitable source of constant DC voltage and ground and provided with potentiometer taps 29, 30 actuated by knobs 15, 19 respectively to select a desired voltage. The speed reference voltage is applied to an input resistor 31 of summer 14, while the acceleration reference voltage is applied to an input resistor 32 of integrating summer 18.

Summers 14, 18 include high gain DC operational amplifiers 33, 34 respectively. These are solid state transistorized units and are commercially available, such as Model No. 44D221506GO1, manufactured by the General Electric Co. When employed with resistive feedback and resistive input impedances, they will provide summation of two or more input signals. When employed with a capacitive feedback and resistive input impedances, they will provide the time integral of the summation of two or more input signals. The foregoing uses of such operational amplifiers are well known in the art. It also should be noted that such amplifiers reverse the polarity of the input voltage.

Amplifier 33 is employed as a simple summing amplifier by connecting a resistive feedback impedance 35 from its output to its input. Amplifier 34, on the other hand, utilizes a feedback circuit which includes a feedback capacitor 37, causing it to function as an integrating summer.

The low value gate 20 operates by virtue of the inclusion in the operational amplifier circuits of opposed diodes 38, 39 connected to a common junction 40. A negative voltage source is also connected to junction 40 through a resistor 41 to enable the voltage at junction 40 to become negative. The output from low value gate 20 appears on lead 42 connected to junction 40 and is a valve positioning signal which is supplied to control valve amplifiers (not shown). The valve positioning signal on lead 42 will either correspond to the output of summer 14 or the output of the integrating summer 18 but not both.

The arrangement of amplifiers and hydraulic components between the low value gate 20 and the steam valve are such that, as the valve positioning signal becomes more negative, the steam valves will open wider. The function of the low value gate 20 is to allow only the most positive, i.e., the signal representing the smallest valve opening, to appear on lead 42.

Briefly, the operation of the low value gate 20 is as follows. Whenever a voltage appears at junction 40 on the common (cathode) side of diodes 38, 39 which is more positive than the voltage appearing on the other (anode) side of either of the diodes 38 or 39, that diode will start to cut off. For example, if summer 14 tends to furnish a more positive voltage to junction 40 than summer 18, then there is reverse polarity across diode 38 and it will begin to cut off. The effect of a tendency toward cut-off in one of the diodes is to open the closed loop of the associated amplifier, causing that amplifier to saturate in a negative direction and cut the diode off even more sharply. Hence the common output junction 40 will only display the voltage from the summer whose diode 38 or 39 is still conducting, i.e. the summer whose output is most positive.

The operation of the control system is as follows. Assuming the acceleration reference and speed reference knobs 15 and 19 are set to selected values while the turbine is at standstill or on turning gear, one of the two reference signals will predominate and pass through low value gate 20 to initially open the steam valves and the turbine will begin to accelerate. Assuming the speed reference is set to indicate substantially rated speed, the speed error signal will initially be much greater (more positive) than the acceleration error (since the turbine is accelerating) and the device will be under acceleration control.

As the turbine acceleration becomes greater, an increasing negative signal will be supplied through input resistor 28 serving to partially offset the positive acceleration reference voltage applied to input resistor 32. The resulting less positive error signal, when inverted in polarity by the amplifier 34 becomes the more positive or gated error signal. It will reduce the value opening so as to reduce the tendency of the rotor to accelerate.

It will be observed that a condition of constant acceleration comprises a whole family of turbine acceleration curves, depending on the initial conditions, boiler pressure, etc. Therefore, in order to cause the turbine to follow a selected single "speed ramp" or repeatable acceleration pattern, the feedback capacitor 37 is employed so that the time integral of the acceleration error rather than the acceleration error itself is supplied to the low value gate. By use of the integrating summer, the valve will be positioned so that the acceleration of the turbine will be exactly that called for by the acceleration reference 19, regardless of steam pressure fluctuations.

As the turbine approaches rated speed, the speed error signal will become less positive (more positive on the output end of the inverting amplifier 33). Hence the speed error signal will suddenly become the gated signal and will demand a more closed valve position than the integrated acceleration error signal. Therefore, automatic changeover from acceleration control mode to speed control mode is achieved near selected speed when the low value gate 20 refuses to accept the output of integrating summer 18 and, instead, gates only the output of summer 14.

Once on speed control, variations in the turbine speed appear as relatively small error signals and continue to be the only signals passing through the low value gate 20 to control valve position.

A modified form of the invention shown in FIG. 3 illustrates that the low value gate may be employed with any number of speed and acceleration responsive valve positioning signals so as to gate only a desired signal to control the valve. In FIG. 3, the toothed wheel 5 provides pulses to sensors 3, 4 which are shown in schematic form as providing inputs to speed control channel 6 and acceleration control channel 7. Speed control channel 6 includes all of the elements 8, 10, 12, 13, 14, shown in FIG. 1, while similarly acceleration control channel 7 includes all of the elements 9, 11, 16, 17 and 18 of FIG. 1.

Redundancy features as to both speed and acceleration are provided by additional sensors 3a, 4a supplying a second speed control channel 6a and a second acceleration control channel 7a respectively. The acceleration reference signal for both acceleration channels is set by knob 19 and the speed reference signal for both speed channels is set by knob 15 in a manner similar to that disclosed previously. The components of speed control channel 6a and acceleration control channel 7a may be essentially duplicates of the components in analogous channels 6, 7 respectively.

The outputs from the two speed control channels 6, 6a comprise two substantially identical (redundant) speed error signals, and the outputs from circuits 7, 7a comprise two substantially identical (redundant) integrated acceleration error signals. All four signals are applied to the low value gate 20a. The outputs are connected to a common lead 40a which, in turn, is connected to the turbine valve amplifier as before. The operation of gate 20a is such that the most positive voltage applied to lead 40a will be gated as the corresponding diode conducts. The other three diodes will experience sharp cut-off as before. It is immaterial how many error signals are applied to the low value gate, since only the one resulting in the smallest valve opening will be effective.

In practice, the two speed error signals from devices 6, 6a would be adjusted to vary slightly from one another. Similarly, the two integrated acceleration error signals from devices 7, 7a would be adjusted to vary slightly from one another. In the event of failure of a component in one of the channels or failure of one of the sensors, the redundant signal in the analogous channel for the mode in which the turbine was previously operating will control the turbine.

The operation of the modified form in FIG. 3 would be much the same as before, i.e., the valve positioning signal calling for the smallest valve opening would predominate, with the added feature that the predominating or controlling error would be backed up by a substantially identical error signal.

A second modified form of the invention is shown in FIG. 4, in which the same elements previously shown in FIG. 1 have the same reference numerals, while the added elements are labeled and described as follows.

The turbine 2 is shown driving a generator 50 arranged to supply power to main electrical leads 51 through a breaker 52. Leads 51 are connected with a main network served by other generators, as is known in the art.

Load supplied by generator 50 is sensed by load sensor 53 which is a commercially available component providing a D.C. voltage proportional to load. A suitable sensor for this use is an A.C. watt transducer, Catalog No. 50–470121AWAA1 manufactured by the General Electric Company which provides 1 ma. D.C. output for each 500 watts of load.

The D.C. signal from sensor 53 represents actual load on generator 50. To give a signal representing actual time rate of change of load on the generator, the D.C. signal is differentiated in a differentiator 54, which may simply employ a capacitor as explained previously in connection with differentiator 16.

A selectable load reference signal is provided by means of load reference source 55, as selected by knob 56. Similarly, a selectable load rate reference signal is provided by means of load rate reference source 57, as controlled by knob 58. These reference sources may simply be potentiometers connected to a constant D.C. source with a slidable tap for selecting a fraction of the total source voltage. They are essentially the same as speed reference source 13 and acceleration reference source 17 described previously.

A selector unit 59 serves to disconnect acceleration reference source 17 and differentiator 16 from summer 18 and to connect load rate reference source 57 and differentiator 54 to summer 18. Similarly, a selector unit 60 is used to alter the input signals for summer 14 by adding load reference to speed reference and actual load to actual speed. Selector units 59, 60 are shown simply as sets of contacts with movable connector arms since D.C. signals are employed, but modification for other types of signal switching would be obvious to one skilled in the art. Selector units 59, 60 are ganged to main breaker 52. Downward movement of the connection arms of selectors 59, 60 and breaker 52 connects the generator to the line and convert from speed/acceleration control to load/load rate control.

The load rate reference signal from source 57 and the actual load rate signal from differentiator 54 are compared in the integrating summer 18 and the integrated error signal serves as one input to low value gate 20.

Similarly, the total reference signal from sources 55 and 13 and the actual speed/load signal from sensors 3 and 53 are compared in summer 14 and the integrated speed/load error signal serves as the other input to low value gate 20. Either input to the low value gate can serve as a valve positioning signal through components 21, 22, but only the signal representing the smallest valve opening can control at one time.

The operation of the modification of FIG. 4 will now be described. Assuming that the turbine has been under acceleration and speed control as described in connection with FIGS. 1–3 and now at full speed, selector units 59, 60 and breaker 52 appear as shown. The selector arms of selector units 59, 60 and the breaker are moved downward, connecting the generator to the line; disconnecting the signals controlling rate of turbine speed change, i.e., reference acceleration and actual acceleration from summers 14, 18; and connecting the signals representing reference load, actual load, reference load rate and actual load rate to summers 14, 18.

The deviation between actual load and desired load will initially by very large since the turbine-generator has not been carrying load. The deviation between actual rate of change of load and desired rate of change of load will be much smaller. Therefore, the latter time integrated error signal is gated and serves to set valve 1 at the proper position for adding load at the rate set by selector knob 58. As the load on the turbine-generator approaches the desired load set with selector knob 56, the error between desired load and actual load will become very small and it will now become the gated signal and assume control of steam valve 1.

While the invention has been described in connection with the control of particular operating conditions, it will be apparent that the same principle can be used in the control of any condition of the prime mover, such as temperature, pressure, etc., such that its rate of approach to a desired value is controlled, with automatic conversion to control of the condition itself so that it will stay at the desired value.

Other modifications of the invention will occur to those skilled in the art, and while there has been described herein what is considered to be the preferred embodiment of the invention, it is, of course, intended to cover in the appended claims all such modifications as fall within the true spirit and scope of the invention.

What I claim as new and desire to secure by Letters Patent of the United States is:

1. In a control system for a prime mover of the type having servo means controlling the release of energy to the prime mover in response to an electrical signal, the combination of:
    first means supplying a first electrical signal responsive to an operating condition of the prime mover and representing a deviation from a desired value of the condition,
    second means supplying a second electrical signal responsive to the time rate of change of said operating condition and representing a deviation from a desired rate of change of the condition,
    gating means connected to both said first and second means and arranged to continuously supply only the one of said signals to said servo means which results in the lowest release of energy to the prime mover.

2. The combination according to claim 1 where said first means is arranged to provide a prime mover speed error signal and where said second means is arranged to provide a prime mover acceleration error signal.

3. The combination according to claim 1 where said first means is arranged to provide a prime mover speed/load error signal and where said second means is arranged to provide a prime mover load rate error signal.

4. The combination according to claim 1 including third and fourth means arranged to provide third and fourth signals of the same type as the first and second signals respectively but with respect to a second operating condition of the prime mover, and including selector means for applying either the first and second signals to said gating means or the third and fourth signals to the gating means alternatively.

5. The combination according to claim 1 including third and fourth means arranged to provide third and fourth signals substantially the same as the first and second signals respectively and with respect to the same operating condition of the prime mover, said first, second, third and fourth signals being supplied simultaneously to said gating means to provide redundant control.

6. In a control system for a prime mover of the type having servo means controlling the release of energy to the prime mover in response to an electrical signal, the combination of:
    first means providing a first electrical signal representative of the difference between desired speed and actual speed of the prime mover,
    second means providing a second electrical signal representative of the time integral of the difference between desired acceleration and actual acceleration of the prime mover, and
    gating means connected to both the first and second means and supplying only the one of said first and second signals to the servo means which results in the lowest release of energy to the prime mover.

7. In a control system for a turbine of the type having a valve with servo means positioning the valve in response to electrical signals, the combination of:
    first means providing a first electrical speed error signal representative of the difference between desired speed and actual speed of the turbine,
    second means providing a second electrical signal representative of the time integral of the difference between desired acceleration and actual acceleration of the prime mover, and
    gating means connected to said first and second means and continuously supplying only the one of said first and second signals to the servo means which results in the least opening of said valve.

8. The combination according to claim 7 including third means providing a redundant electrical speed error signal representative of the difference between desired speed and actual speed of the prime mover, said redundant signal being also supplied to said gating means.

9. The combination according to claim 7 including third means providing a redundant electrical signal representative of the time integral of the difference between desired acceleration and actual acceleration, said redundant signal being also applied to said gating means.

10. The combination according to claim 7 including third and fourth means which are substantially identical to said first and second means respectively and providing third and fourth redundant speed and acceleration responsive signals, said redundant signals being also applied to said gating means in the manner of said first and second signals.

11. The combination according to claim 7 including:
    third means providing a third electrical speed/load error signal representative of the difference between desired load and actual load on the turbine,
    fourth means providing a fourth electrical signal representative of the time integral of the difference between desired rate of loading and actual rate of loading the prime mover, and selector means for removing the first and second signals from the gating means and supplying the third and fourth signals to the gating means.

12. In a control system for a turbine of the type having a valve with servo means positioning the valve in response to a DC electrical valve positioning signal, the combination of:

a first reference source supplying a first selectable DC reference potential representing a desired turbine operating condition, means responsive to the actual turbine operating condition supplying a varying DC potential of opposite polarity from that of the first reference potential, first operational amplifier means summing said first reference and operating condition potentials to provide a DC electrical condition error signal at its output end, a second reference source supplying a second selectable DC reference potential representing a desired rate of change of said operating condition, means responsive to actual rate of change of said operating condition of the turbine and supplying a varying DC potential of opposite polarity from that of the second reference potential, second operational amplifier means connected to sum the second reference and rate of change potentials and arranged to provide the time integrated value thereof at its output end, and gating means comprising a pair of opposed diodes, each connected at the respective output end of one of said operational amplifiers with circuit means to permit feedback current to flow to the respective amplifier input ends, said diodes being connected to a common output junction therebetween, whereby only one of the operational amplifiers means can provide an output signal from said output junction at a time.

13. The combination according to claim 12, wherein said first reference and operating condition potentials summed in the first operational amplifier represent desired turbine speed and actual turbine speed respectively and wherein said second reference and rate of change potentials summed in the second operational amplifier represent desired turbine acceleration and actual turbine acceleration respectively.

14. The combination according to claim 12, wherein said first reference and operating condition potentials summed in the first operational amplifier represent desired turbine load and actual turbine load respectively and wherein said second reference and rate of change potentials summed in the second operational amplifier represent desired rate of loading the turbine and actual rate of loading the turbine respectively.

References Cited
UNITED STATES PATENTS

| | | | |
|---|---|---|---|
| Re. 24,809 | 4/1960 | Offner | 60—39.28 |
| 2,984,214 | 5/1961 | Wysocki | 91—363 |
| 3,274,443 | 9/1966 | Eggenberger | 317—5 |
| 3,288,160 | 11/1966 | Eggenberger | 137—27 |

CLARENCE R. GORDON, *Primary Examiner.*